(12) United States Patent
Hedegaard et al.

(10) Patent No.: US 11,879,428 B2
(45) Date of Patent: Jan. 23, 2024

(54) WIND TURBINE BLADE

(71) Applicant: Siemens Gamesa Renewable Energy A/S, Brande (DK)

(72) Inventors: Lars Hedegaard, Boulder, CO (US); Allan Hurup, Nibe (DK); Jens Jørgen Østergaard Kristensen, Nørresundby (DK); Wei Sun, Gistrup (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/919,647

(22) PCT Filed: Apr. 22, 2021

(86) PCT No.: PCT/EP2021/060559
§ 371 (c)(1),
(2) Date: Oct. 18, 2022

(87) PCT Pub. No.: WO2021/219487
PCT Pub. Date: Nov. 4, 2021

(65) Prior Publication Data
US 2023/0167799 A1 Jun. 1, 2023

(30) Foreign Application Priority Data
Apr. 27, 2020 (EP) .................................... 20171589

(51) Int. Cl.
*F03D 1/06* (2006.01)
(52) U.S. Cl.
CPC ........... *F03D 1/0675* (2013.01); *F03D 1/065* (2013.01); *F05B 2280/6003* (2013.01)

(58) Field of Classification Search
CPC .................. F03D 1/0675; F03D 1/065; F05B 2280/6003; Y02E 10/72; Y02P 70/50
See application file for complete search history.

(56) References Cited

U.S. PATENT DOCUMENTS

| 2011/0182742 | A1 | 7/2011 | Hirano et al. |
| 2015/0078911 | A1* | 3/2015 | Gruhn ...................... F03D 9/25 |
| | | | 416/230 |
| 2017/0218918 | A1 | 8/2017 | Cieslak et al. |
| 2018/0345603 | A1 | 12/2018 | Bech et al. |

FOREIGN PATENT DOCUMENTS

| EP | 2526287 A2 | 11/2012 |
| EP | 2543499 A1 | 1/2013 |
| EP | 3505751 A1 | 7/2019 |
| JP | 2001165033 A | 6/2001 |

OTHER PUBLICATIONS

PCT International Search Report and Written Opinion of International Searching Authority dated Aug. 13, 2021 corresponding to PCT International Application No. PCT/EP2021/060559 filed Apr. 22, 2021.

* cited by examiner

*Primary Examiner* — Brandon D Lee
(74) *Attorney, Agent, or Firm* — Schmeiser, Olsen & Watts LLP

(57) ABSTRACT

A wind turbine blade includes an elongated blade body extending from a root to a tip with a trailing edge, whereby at least one beam-like reinforcement means is integrated in the blade body adjacent to the trailing edge for reinforcing the region of the trailing edge, with the reinforcement means extending partly over the length of the blade body, wherein the reinforcement means is a pre-casted carbon beam including carbon fibers.

14 Claims, 3 Drawing Sheets

WIND TURBINE BLADE

CROSS-REFERENCE TO RELATED APPLICATIONS

This application claims priority to PCT Application No. PCT/EP2021/060559, having a filing date of Apr. 22, 2021, which claims priority to EP Application No. 20171589.3, having a filing date of Apr. 27, 2020, the entire contents both of which are hereby incorporated by reference.

FIELD OF TECHNOLOGY

The following relates to a wind turbine blade, comprising an elongated blade body extending from a root to a tip with a trailing edge, whereby at least one beam-like reinforcement means is integrated in the blade body adjacent to the trailing edge for reinforcing the region of the trailing edge, with the reinforcement means extending partly over the length of the blade body.

BACKGROUND

Modern wind turbines comprise several, usually three wind turbine blades attached to a rotor. The blades are interacting with the wind making the rotor rotate, as is commonly known.

Each wind turbine blade comprises an elongated blade body having a root for attaching the blade to the rotor hub. The blade body extends from the root to a tip. The elongated body varies its cross sectional shape widely over its length. The cylindrical root section changes to a flattened air-foil cross section, which gets smaller and smaller towards the tip. The flat blade has a leading edge and a trailing edge at the opposite body side as well known. Especially the cross section of the blade body in the region of the trailing edge varies significantly over the body length.

It is necessary to provide reinforcement means at or within the blade body for providing the respective needed stiffness in view of the loads resting on the blade. A high stiffness in the edge region is required, also in the region of the trailing edge, which, as mentioned, varies its shape and thickness significantly. For stiffening the trailing edge region one or more beam-like reinforcement means in form of glass fiber beams, each beam comprising many separate glass fiber web layers embedded in a matrix like a resin, are arranged in respectively integrated in the blade body. The design of these glass fiber reinforcement beam(s) in view of the required mechanical properties respectively stiffness is challenging, as the beam thickness is constrained by the limited space near the trailing edge. So the integration of the beam-like glass fiber reinforcement means is difficult.

Another aspect is that a thick trailing edge glass reinforcement beam design leads to an irregular trailing edge core shape, it becomes long and slender, which increases the trailing edge core manufacturing difficulties. The trailing edge cores are arranged adjacent to the glass beam, and as the shape of the glass beam is quite complex and varying over its length, the trailing edge cores are also difficult in manufacturing and shaping.

Finally the relatively thick glass beam reinforcement significantly increases the blade mass and the mass moment, which in turn has an influence on other structural components like the setup of the shell and the root and a high impact on the blade bearing capacity and the design of the hub.

SUMMARY

An aspect relates to provide an improved wind turbine blade.

For solving the problem an inventive wind turbine blade is characterised in that the reinforcement means is a pre-casted carbon beam comprising carbon fibers.

In the inventive wind turbine the beam-like reinforcement means is realised by a pre-casted carbon beam comprising carbon fibers. This carbon beam is pre-casted respectively pre-fabricated and can therefore be easily arranged in the mould, in which the blade is manufactured respectively setup and infused. This carbon beam replaces the glass fiber beam reinforcement, which is used in the prior art, and which is built layer by layer in the mould and finally infused. So the inventive blade therefore no longer shows the disadvantages resulting from the in-mould integration of the glass fiber layer beam.

The carbon beam comprises carbon fibers, which are embedded in a casting agent, a resin respectively a resin matrix. As the beam is pre-casted, it can be exactly shaped to the needs respectively in view of the available space in the trailing edge region. So it can be exactly adjusted to the given geometry respectively can be designed to the needs especially also in view of the needed mechanical properties.

Furthermore the carbon beam shows enhanced mechanical properties over a comparable glass beam, so that the carbon beam comprising the carbon fibers is smaller in its design while providing better mechanical properties in view of stiffening or reinforcing the trailing edge region.

With the smaller design also a reduction of weight goes along, resulting in a reduced weight or mass of the blade, which finally results in the possibility to adapt the overall blade design especially regarding the root region etc.

Regarding the final setup of the carbon beam several embodiments are provided. According to a first embodiment the carbon beam is made of a single pultruded carbon fiber profile or of one or more stacks of two or more pultruded carbon fiber profiles casted in a matrix material. According to this embodiment the carbon beam is built by one or more pultruded carbon fiber profiles, by stacking two or more pultruded carbon fiber profiles above each other. The beam may comprise only one such stack, while it may also comprise two or more stacks arranged side by side. A biaxial material, a carbon biaxial material, may be inserted between each two adjacent stacked pultruded carbon fiber stacks to enhance the transverse properties of the carbon beam. Each pultruded carbon fiber profile comprises carbon fibers, which are embedded in a matrix material like a resin. Finally the whole stack or the several stacks are embedded in the matrix material like the resin for fixing the stacked profile and to finally build the beam. The matrix material can be different from the resin for fixing the stacked profile.

As the beam is made of separate stacked pultruded carbon fiber profiles, it is possible to vary the overall cross sectional shape of the final carbon beam. So the height and/or width of the stack respectively the carbon beam varies over the carbon beam length. The final carbon beam for example may become thicker and wider, seen from the root to the tip, which can be realised by varying the number of stacked profiles and by using profiles with different width etc. This allows for a simple design variation of the carbon beam and for adapting it to the given space.

In an embodiment the carbon beam has a rectangular cross section. Embodiments of the invention are not restricted to such a rectangular cross section, as also a trapezoidal, a polygonal or a partially rounded cross section or the like may be advantageous, depending on the given space and the integration of the carbon beam in the overall blade body shell.

For integrating the carbon beam, the carbon beam having a rectangular cross section or at least one rectangular edge region etc., it is desirable that an elongated core element having a wedge-like cross section is arranged at least at one side of the carbon beam and extends at least partially over the length of the carbon beam. If a rectangular carbon beam is used, on both sides respective wedge-like core elements are arranged. They extend over at least a part of the carbon beam length, over the whole beam length and allow for a softer transition of the carbon beam to the adjacent shell regions, to which it is mechanically connected by means of fiber webs and respective infused matrix material, from which the shell is built.

In an embodiment the carbon beam is arranged at one side next to an outer layer or surface of the blade body. In this embodiment the carbon beam is quite small in thickness, although providing excellent mechanical properties. So it is possible to arrange the beam at the side of the blade body, at the suction side, while it is certainly also possible to provide two carbon beams at both sides, i.e. the pressure side and the suction side. The one or both carbon beams are arranged close to the trailing edge, but need not necessarily extend directly into the very end edge region. As the carbon beam is, as mentioned, quite slim or thin, it is easily possible to integrate him into the shell setup. This can be done by respective fiber webs covering the carbon beam, which fiber webs are infused in a resin matrix etc.

As it is possible to arrange a carbon beam only at one blade side close to the outer blade surface, a respective reinforcement beam needs to be placed at the other side. Here it is possible to integrate a reinforcement glass beam comprising glass fibers, which glass beam is arranged opposite to the carbon beam at the opposite side next to an outer layer or surface of the blade body. The carbon beam is connected to the reinforcement glass beam by means of a connection web which is embedded in a respective resin matrix, so that both beams arranged at the opposite blade body sides are firmly connected to the respective shell region and are firmly connected to each other, so that the trailing edge region is well stiffened. In an alternative it is also possible to integrate a second carbon beam at the opposite side next to the outer layer, which second carbon beam being set up like the first carbon beam, while both carbon beam being connected by means of a connection web embedded in the resin matrix. Here a carbon beam to carbon beam connection is given.

For filling the remaining space in the trailing edge region extending directly to the edge it is that a foam core element, which extends, seen in the cross section, towards the trailing edge, is sandwiched at least partially between an upper and a lower shell of the blade body, and especially the carbon beam and the glass beam. As mentioned, only one carbon beam may be integrated at the upper or lower shell, or two carbon beams may be integrated in the upper and lower shell, or one carbon beam and one glass beam may be integrated in the upper and lower shell. However the final beam setup is, the remaining space in the trailing edge region is filled with the foam core element, which extends along the trailing edge region to the tip and which extends into the trailing edge. So this foam core element is sandwiched between the outer and inner shell, which shells may be provided with the respective beams.

Finally it is desirable that a further core element is connected to a wedge-like core element and/or to the glass beam next to the respective outer layer. Each upper and lower shell is built with further respective core elements, which are connected to the integrated beam, either the carbon beam or the glass beam. If a wedge-like core element is arranged next to the carbon beam, the further core element is connected to this wedge-like core element. The connection is also realised by means of fiber web layers covering the connection region and by infusing it in a respective resin matrix.

The carbon beam described previously in the first embodiment is made of several pultruded carbon fiber profiles. In an alternative it is possible that the carbon beam is made of several pultruded carbon fiber rods or carbon fiber rovings casted in a matrix material. According to this embodiment, no separate carbon fiber profiles, of rectangular shape, are used, but pultruded carbon fiber rods having e.g. a circular or oval shape are used, which are arranged side by side and above each other, according to the needs respectively the space available. The pultruded carbon fiber rods are also somehow adjustable or variable in their shape, when arranging them to the multi rod arrangement, so that they can be deformed to a certain extent and the resulting carbon beam can be overall shaped, when it is finally embedded in the pre-cast matrix material. So this arrangement allows for an alternative setup of the carbon beam, and especially allows to shape the carbon beam with a cross section corresponding to the space defined by the outer layers and the trailing edge respectively the shells, as will be mentioned later.

In an alternative to using carbon fiber rods also carbon fiber rovings may be used, which are pre-casted in a matrix material. These rovings may be used in form of strands or in form of webs which can be stacked above each other for building a web stack, which can also be adjusted in its shape due to the given space. The rovings will finally be infused with a matrix material.

The carbon beam of this second embodiment shows the same positive aspects and features as the carbon beam according to the first embodiment. It can also be shaped as a thin, plate-like carbon beam, like in the first embodiment, or it can be, as it is somehow formable in its shape, be adjusted to the given space in the trailing edge region for filling it, as will be mentioned in detail below.

The carbon beam made of fiber rovings casted in a matrix material may solely comprise carbon fiber rovings. Alternatively it is also possible that the carbon beam comprises hybrid carbon/glass fiber rovings. If the rovings are used in form of webs a stack can be built which stack is a hybrid stack comprising carbon fibers as well as glass fibers, when the overall stack is finally infused in the resin material.

In an embodiment the carbon beam extends towards the trailing edge and is arranged next to at least one outer layer respectively surface of the blade body. Other than the first alternative, here the carbon beam, no matter how it is built in the second embodiment, directly extends into the trailing edge respectively ends close to it. It is arranged adjacent or attached to at least one blade body side respectively shell or outer layer, but it can also extend to the opposite side of the blade body having a cross section corresponding to the space defined by the outer layers respectively the upper and lower shell and the trailing edge. According to this embodiment, the cross section of this carbon beam, either made of the pultruded carbon fiber rods or the rovings or fiber web layers infused in the respective matrix material, corresponds to the given space in the trailing edge region respectively directly at the trailing edge. This allows for filling this space with the carbon beam having the enhanced mechanical properties, so the trailing edge itself can directly be reinforced. A remaining small space, especially between the carbon beam and the final edge, may be filled with glass fiber webs and matrix material, while only little web and resin amount is used for filling that space, as most of it is filled by the inventive carbon beam.

Furthermore a foam core element may be arranged adjacent to the carbon beam extending further into the blade body and extending between the outer layers respectively both shells. This foamed core element fills further space in the trailing edge region and stiffens it. The foam core element connects to further shell core elements, which are arranged in both outer layers respectively the upper and lower shell stiffening the same.

Apart from the wind turbine blade, embodiments of the invention also refer to a wind turbine, with a rotor comprising several wind turbine blades as described above.

BRIEF DESCRIPTION

Some of the embodiments will be described in detail, with reference to the following figures, wherein like designations denote like members, wherein.

DETAILED DESCRIPTION

Figure 1:
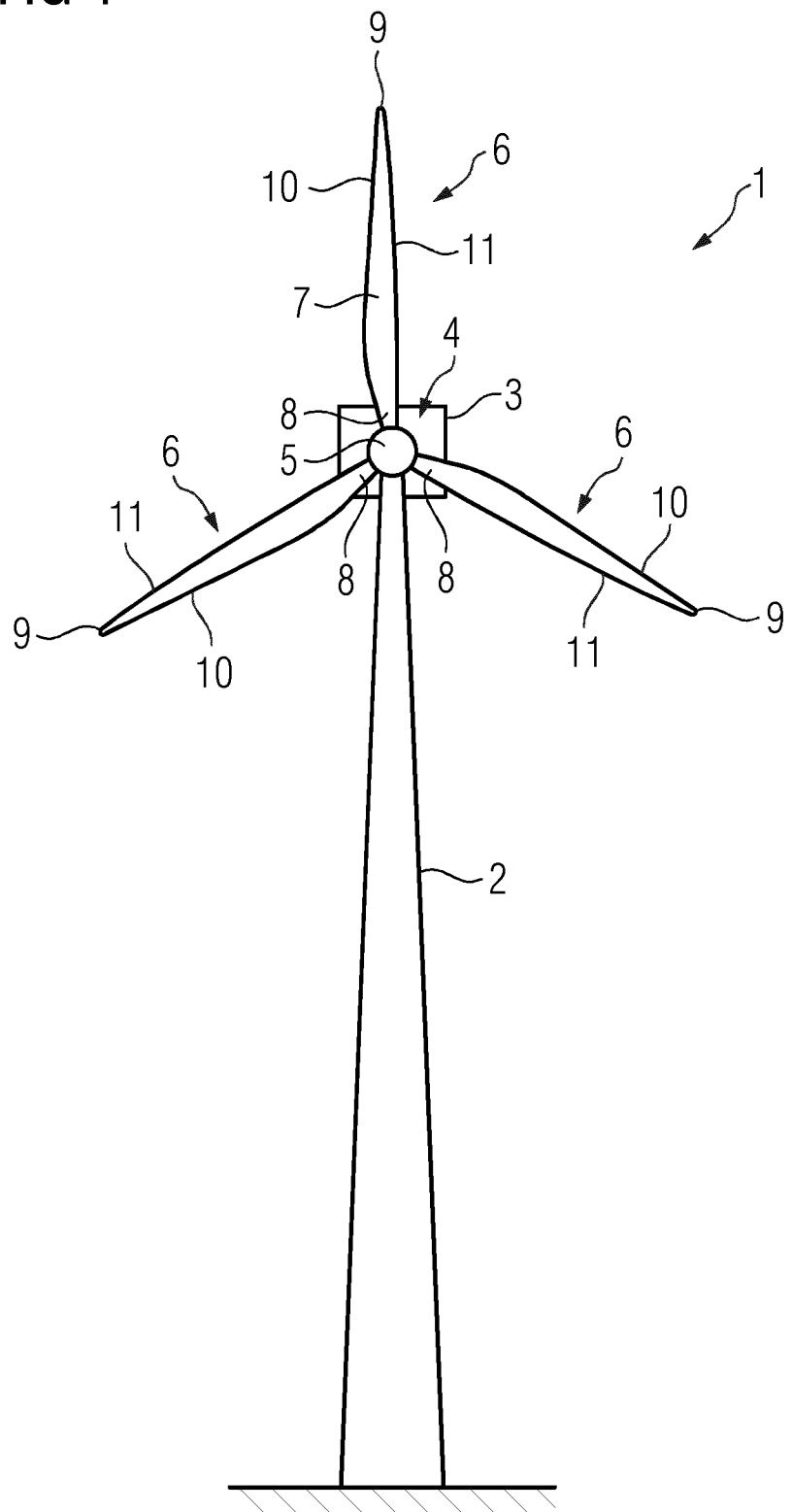
FIG. 1 shows a principle sketch of an inventive wind turbine comprising three inventive turbine blades.

FIG. 1 shows a principle sketch of an inventive wind turbine 1, comprising a tower 2 with a nacelle 3 attached to the tower top and a rotor 4 having a hub 5, to which three wind turbine blades 6 are attached. Each wind turbine blade comprises a longitudinal blade body 7 with a root 8, by which it is attached to the hub, and a tip 9 at the blade body end. In view of the rotation direction each blade 6 further has a leading edge 10 and a trailing edge 11 on the other side. The respective trailing edge region of each blade 6 is specifically designed according to embodiments of the invention, which will be described in more detail in the following.

Figure 2:
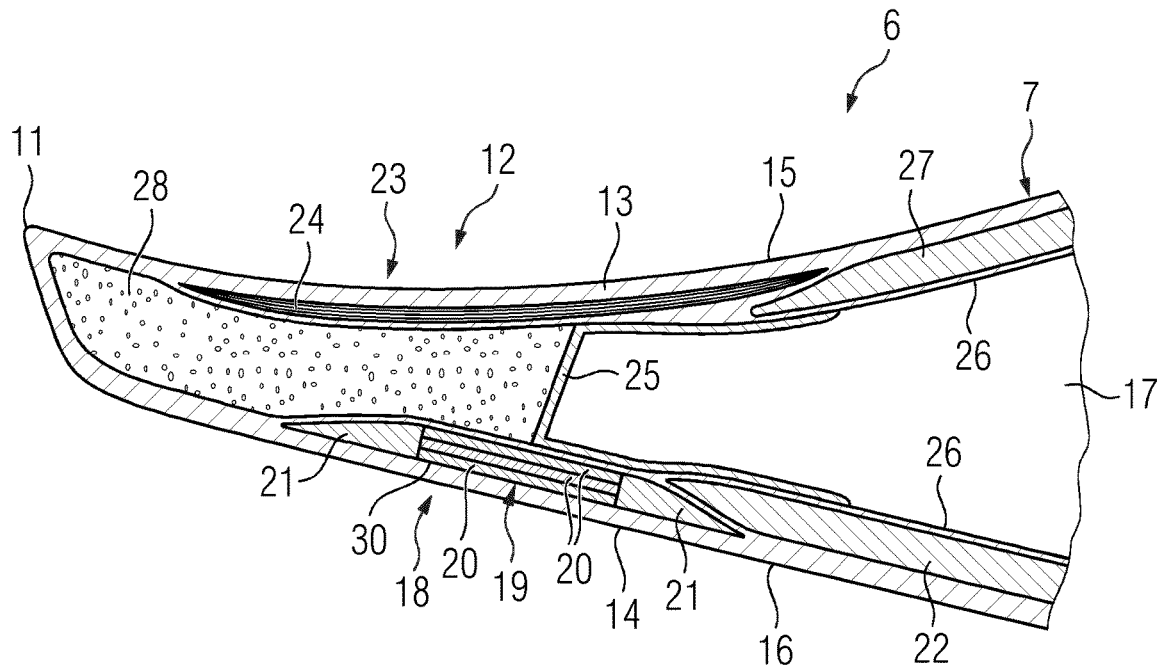
FIG. 2 shows a partial cross section view of a wind turbine blade in the trailing edge region of a first embodiment of the wind turbine blade.

FIG. 2 shows a first embodiment of an inventive wind turbine blade 6 as a partial cross section view of the trailing edge region 12, which runs into the trailing edge 11. The blade body 7 comprises a first or upper shell 13 and a second or lower shell 14. The first or upper shell 13 comprises an outer layer 15 or layer stack, while the second or lower shell 17 comprises an outer layer 16 or layer stack, which are built of one or several fiber webs which are finally infused in a resin matrix.

Resulting from this shell construction, the inner 17 of the blade body 7 is hollow resulting in the necessity of reinforcing the shell structure. Problems specifically arise in the trailing edge region 12, which significantly varies its cross section seen from the root to the tip.

According to embodiments of the invention at least one reinforcement means 18 in form of a pre-casted respectively pre-fabricated carbon beam 19 comprising carbon fibers is integrated in the shell structure, here in the second or lower shell 14. In this embodiment the carbon beam 19 is made of a stack of three separate pultruded carbon fiber profiles 20, which are stacked above each other with carbon biaxial layers (not shown) between the profiles and which are pre-casted in a matrix material, usually a resin, which matrix material is used for fixing the separate profiles to a single carbon beam. The matrix material 30 is shown as an encapsulating material, but it also infuses the stack between the respective profiles, which may be distanced by some sandwiched glass fiber webs allowing an infusion of the sandwich area.

As FIG. 2 shows, the carbon beam has a rectangular cross section, as all pultruded carbon fiber profiles 20 have a rectangular cross section. It is obvious that by varying the width of the separate carbon fiber profiles 20 it is possible to vary the overall width of the stack respectively the carbon beam 19. It is furthermore possible to vary the cross sectional shape from a rectangular shape for example to a trapezoidal shape or the like simply by using pultruded carbon fiber profiles 20 having different width. Finally it is obvious that by varying the number of stacked carbon fiber profiles 20 the height of the stack and finally the carbon beam 19 can also be varied.

The carbon beam 19 is arranged at the second or lower shell 14 next to the outer layer stack or layer 16. On both sides of the carbon beam 19 elongated core elements 21 having a wedge-like cross section are arranged for providing a smooth transition to the outer layer 16. These wedge-like core elements 21 may be made of wood like balsawood or a foam material or the like.

Adjacent to the right wedge-like core element 21 a further core element 22 is arranged, which has also a wedge-like edge section so that it smoothly fits with the core element 21. This core element 22 is also integrated into the shell 14 and stiffens the same.

On the opposite side respectively at the first or upper shell 13 another reinforcement means 23 in the form of a reinforcement glass beam 24 is integrated in the shell 13 respectively next to the outer layer 15. This glass beam 24 comprises a stack of separate glass fiber web layers which are embedded in the shell resin matrix and which glass beam stiffens the first or upper shell 13.

The carbon beam 19 and the glass beam 23 are connected by a connection web 25, which as a side web closes the trailing edge region 12 to the hollow inner 17 of the blade body 7. The connection web 25 is also embedded in the resin matrix material and therefore firmly attached to the respective inner fiber webs 26 covering the core elements 20, 21 and the carbon beam 19 respectively a core element 27 arranged in the upper shell 13 and connected to the glass beam 24.

As FIG. 2 furthermore shows, the remaining space between the upper and the lower shell 13, 14 and the connection web 25 is filled with a foam element 28 which extends, seen in the cross section, towards the trailing edge 11 and is directly connected to the resin infused shells 13, 14 and sandwiched in part between the carbon beam 19 and the wedge-like core element 21 on the one side and the glass beam 24 on the other side. This foam element 28 completely fills the remaining space and stiffens the direct edge area.

The carbon beam 19 provides extraordinary mechanical properties and allows for a very good stiffening and reinforcement of the trailing edge region 12. It allows to replace a large mass of glass fiber web and resin embedding the fibers, which are usually used to fill the trailing edge region and reinforce it by building a glass fiber beam extending along the trailing edge respectively the trailing region. Therefore by integrating the comparably small carbon beam 19 the mass of the blade can significantly be reduced. The carbon beam 19 is easy to handle during manufacturing of the blade, as the carbon beam 19 itself can directly be placed into the shell mould, in which the shell is manufactured. Furthermore it is possible to use a light-weight foam element 28 for filling the mature part of the space in the trailing edge region 12, which also contributes to the mass reduction.

The carbon beam 19 extends at least partially over the length of the trailing edge 11, but it runs almost entirely into the tip 9. Over its length it may change its width and/or height according to the given space respectively the needed reinforcement or mechanical stability and properties.

Figure 3:
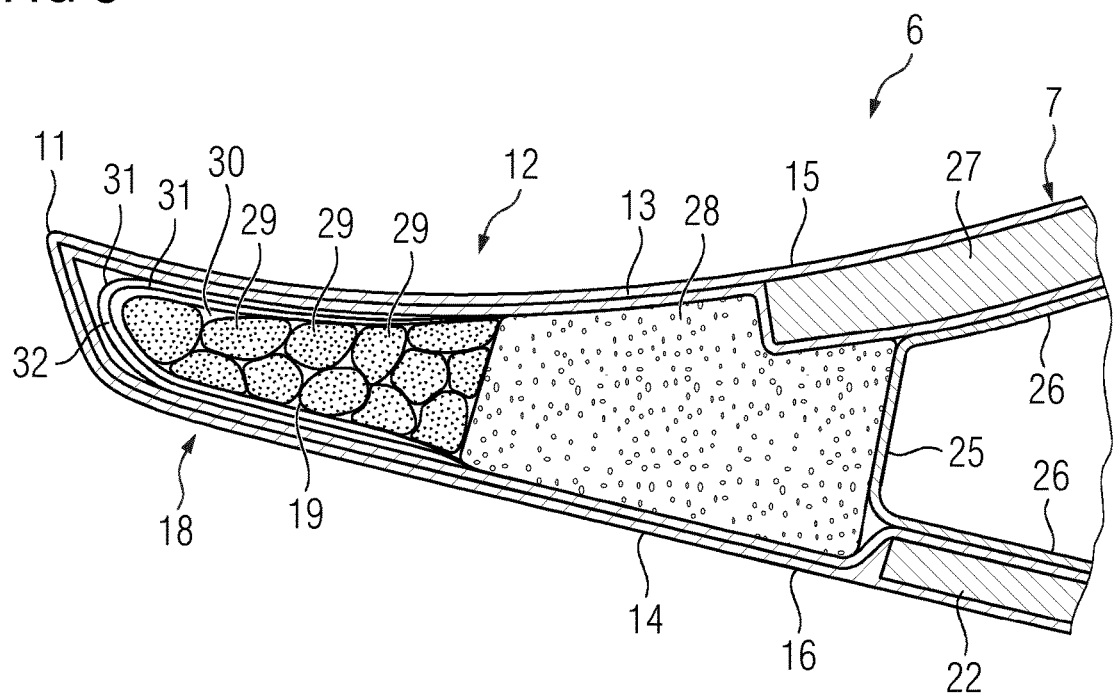
FIG. 3 shows a partial cross section view of a wind turbine blade in the trailing edge region of a second embodiment of the wind turbine blade.

FIG. 3 shows another embodiment of an inventive wind turbine blade 6, again comprising a blade body 7 with the trailing edge 11 and the trailing edge region 12. It also comprises a first or upper shell 13 with an outer layer 15 and a second or lower shell 14 with an outer layer 16.

In this embodiment also a reinforcement means 18 in form of a carbon beam 19 is integrated in the trailing edge region 12, but, compared to FIG. 3, the carbon beam 19 is here arranged very close to the trailing edge 11 and has a cross section which corresponds at least partially to the given cross section of the space between the upper and the lower shell 13, 14.

Here the carbon beam 19 comprises a plurality of pultruded carbon fiber rods 29, which are embedded in a matrix material 30, again a resin. The carbon fibers e.g. extend longitudinal towards the tip 9 and are embedded in the matrix material. The carbon fiber rods 29 are somehow soft and may therefore be arranged in a form where they can somehow be deformed in order to shape the overall cross section of the carbon beam 19, as FIG. 3 shows. In this final form or mould the rods 29 are then infused or embedded in the matrix material 30 which afterwards cures, so that a stable but specifically designed carbon beam 19 can be built.

The remaining space between the carbon beam 19 and the trailing edge 11 is filled with fiber webs 31 embedded in the resin matrix 32, which also embeds the respective web layers building the upper and lower shell 13, 14.

Adjacent to the carbon beam 19 a foam element 28 is arranged, which also extends between both shells 13, 14 and which fills the remaining space in the trailing edge region 12 between both shells 13, 14 and a connection web 25, which here connects the core elements 22 and 27 arranged in the shells 13 and 14 and is covered by respective webs 26, while the whole setup in the trailing edge region 12 is finally infused with the shell matrix material.

Also in this embodiment the carbon beam 19 comprising the pultruded rods 29 extends partially over the trailing edge length, but runs almost entirely to the tip 9. Also here it may certainly vary its width and height, as it is designed to fill the space as far as possible, which space varies significantly along the its length to the tip 9.

Figure 4:
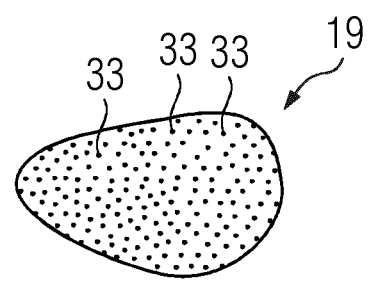
FIG. 4 a cross sectional view of another embodiment of a carbon beam.

While FIG. 3 shows a carbon beam 19 made of a plurality of separate pultruded carbon fiber rods 29, which comprise respective carbon fibers, it is also possible to build a comparable shape-designed carbon beam 19 by using carbon fiber rovings and embed the in a matrix. Such a carbon beam 19 built of carbon fiber rovings 33, which are embedded in a matrix material 30, is shown in a cross sectional view in FIG. 4. Only carbon fiber rovings may be used, or carbon and glass fiber for building a hybrid beam. The rovings extend along the longitudinal axis of the carbon beam 19 and therefore extend along the trailing edge 11 to the tip. Finally also carbon fiber webs may be used. Several fiber webs are stacked for building a web stack, which is then embedded in the matrix material. This web stack may comprise only carbon fiber webs or layers, but it may also be hybrid stack comprising several sandwiched glass fiber webs or layers, which glass fiber webs or layers allow a better infusion of the whole stack also in its volume.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, comprising:
an elongated blade body extending from a root to a tip with a trailing edge, whereby at least one reinforcement means is integrated in the elongated blade body adjacent to the trailing edge for reinforcing a region of the trailing edge, with the at least one reinforcement means extending partly over a length of the elongate blade body,
wherein the at least one reinforcement means is a pre-casted carbon beam comprising carbon fibers, wherein the pre-casted carbon beam is made of several pultruded carbon fiber rods or carbon fiber rovings casted in a matrix material, wherein the pre-casted carbon beam extends towards the trailing edge and is arranged next to at least one outer layer of the elongated blade body, and wherein the pre-casted carbon beam extends to an opposite side of the elongated blade body having a cross section corresponding to a space defined by the upper shell and the lower shell and the trailing edge.

2. The wind turbine blade according to claim 1, wherein the pre-casted carbon beam is made of a single pultruded carbon fiber profile or of a stack of two or more pultruded carbon fiber profiles or of several such stacks arranged side by side, and casted in a matrix material.

3. The wind turbine according to claim 2, wherein a biaxial material layer, is arranged between two stacked pultruded carbon fiber profiles.

4. The wind turbine blade according to claim 2, wherein a height and/or a width of the stack varies over the length of the pre-casted carbon beam.

5. The wind turbine blade according to claim 2, wherein the pre-casted carbon beam has a rectangular, a trapezoidal, a polygonal, or a partially rounded cross section.

6. The wind turbine blade according to claim 2, wherein an elongated core element having a wedge cross section is arranged at least at one side of the carbon beam and extends at least partially over the length of the pre-casted carbon beam.

7. The wind turbine blade according to claim 2, wherein the pre-casted carbon beam is arranged at one side next to an outer layer of the elongated blade body.

8. The wind turbine blade according to claim 7, wherein the pre-casted carbon beam is connected to a reinforcement glass beam comprising glass fibers, or to second carbon beam, which reinforcement glass beam or second carbon beam is arranged opposite to the pre-casted carbon beam at an opposite side next to an outer layer of the elongated blade body and is connected to the pre-casted carbon beam by a connection web.

9. The wind turbine blade according to claim 2, wherein a foam core element extending, seen in a cross section, towards the trailing edge is sandwiched at least partially between an upper shell and a lower shell of the elongated blade body.

10. The wind turbine blade according to claim 9, wherein a further core element is connected to the pre-casted carbon beam or to a core element and/or to the reinforcement glass beam next to the respective outer layer.

11. The wind turbine blade according to claim 1, wherein the pre-casted carbon beam comprises solely carbon fiber rovings or hybrid carbon/glass fiber rovings.

12. The wind turbine blade according to claim 1, wherein a foam core element is arranged adjacent to the pre-casted carbon beam extending further into the elongated blade body and extending between the lower shell and the upper shell.

13. The wind turbine blade according to claim 12, wherein further shell core elements connect to the foam core element next to both outer layers.

14. A wind turbine, with a rotor comprising several of the wind turbine blades according to claim 1.

* * * * *